(12) United States Patent
Kim et al.

(10) Patent No.: US 10,704,790 B2
(45) Date of Patent: Jul. 7, 2020

(54) MOVEABLE AIR CONDITIONER

(71) Applicant: HANON SYSTEMS, Daejeon (KR)

(72) Inventors: Yeon Seob Kim, Daejeon (KR); Dong Woo Kim, Daejeon (KR); Jeong Hoon Lee, Daejeon (KR); Yun Sub Chung, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/780,603

(22) PCT Filed: May 19, 2017

(86) PCT No.: PCT/KR2017/005258
§ 371 (c)(1),
(2) Date: May 31, 2018

(87) PCT Pub. No.: WO2017/204500
PCT Pub. Date: Nov. 30, 2017

(65) Prior Publication Data
US 2019/0072293 A1    Mar. 7, 2019

(30) Foreign Application Priority Data

May 23, 2016 (KR) .................. 10-2016-0062744
Feb. 10, 2017 (KR) .................. 10-2017-0018653

(51) Int. Cl.
*F24F 1/04* (2011.01)
*F24F 13/22* (2006.01)
*F24F 1/02* (2019.01)
*F24F 5/00* (2006.01)
*F24F 11/56* (2018.01)
(Continued)

(52) U.S. Cl.
CPC .................. *F24F 1/04* (2013.01); *F24F 1/02* (2013.01); *F24F 1/03* (2019.02); *F24F 5/0017* (2013.01); *F24F 11/56* (2018.01); *F24F 11/63* (2018.01); *F24F 13/082* (2013.01); *F24F 13/22* (2013.01);
(Continued)

(58) Field of Classification Search
CPC .. F24F 1/04; F24F 13/082; F24F 13/22; F24F 11/63; F24F 2013/088; F24F 2120/00; F24F 2120/10; F24F 2120/12; F24F 2120/14; F24F 2120/20; F24F 2221/12; F24F 2221/125
See application file for complete search history.

(56) References Cited

U.S. PATENT DOCUMENTS 3,802,216 A * 4/1974 Brandimarte ........... F24F 1/022
62/262
7,481,869 B2 * 1/2009 Vanderhoof ......... B01D 53/268
55/385.1

FOREIGN PATENT DOCUMENTS

JP    H05141699 A    6/1993
JP    2001354029 A    12/2001
(Continued)

*Primary Examiner* — Jonathan Bradford
(74) *Attorney, Agent, or Firm* — Norton Rose Fulbright US LLP; James Crawford

(57) ABSTRACT

A movable air conditioner includes an air conditioner main body, an air conditioning unit installed in the air conditioner main body and configured to generate a cold air or a warm air, a control unit configured to control the air conditioning unit, and an attachment/detachment unit configured to detachably attach the air conditioning unit to the air conditioner main body so that the air conditioning unit can be optionally detached from the air conditioner main body and used independently.

24 Claims, 11 Drawing Sheets

(51) Int. Cl.
*F24F 1/03* (2019.01)
*F24F 11/63* (2018.01)
*F24F 13/08* (2006.01)
*H04M 1/725* (2006.01)
*F24F 120/10* (2018.01)

(52) U.S. Cl.
CPC ..... *H04M 1/7253* (2013.01); *F24F 2013/088* (2013.01); *F24F 2120/10* (2018.01)

(56) References Cited

FOREIGN PATENT DOCUMENTS

| | | | |
|---|---|---|---|
| KR | 20090099296 A | 9/2009 | |
| KR | 20120036141 A | 4/2012 | |
| KR | 20160006562 A | 1/2016 | |

\* cited by examiner

MOVEABLE AIR CONDITIONER

This application is a United States national phase application based on PCT/KR2017/005258 filed May 19, 2017, which claims the benefit of Korean Patent Application No. 10-2016-0062744 dated May 23, 2016 and 10-2017-0018653 dated Feb. 10, 2017. The disclosures of the above patent applications are hereby incorporated herein by reference in their entirety.

TECHNICAL FIELD

The present invention relates to a movable air conditioner and, more particularly, to a movable air conditioner configured to remove and independently use only an air conditioning unit as necessary and capable of enabling a user to carry and use the air conditioning unit at any place where cooling or heating is required and enhancing the utilization of the movable air conditioner.

BACKGROUND ART

In general, there is known an air conditioner as a device for keeping comfortable a certain space such as a room or the like (hereinafter generally referred to as "room").

The air conditioner is provided with a compressor, a heating heat exchanger, an expansion valve, and a cooling heat exchanger. The air conditioner is configured to blow a cold air generated in the cooling heat exchanger into a room so as to cool the room, or to blow a warm air generated in the heating heat exchanger into a room so as to heat the room.

However, most of the conventional air conditioners are fixedly installed at one place in a room. Therefore, when only one region of the room is to be locally cooled and heated, the conventional air conditioners cannot cope with such a need.

Particularly, when a room is wide, even if it is desired to cool and heat the room locally, there is no way but to cool and heat the entire room. Unnecessary energy consumption occurs due to such a disadvantage.

In addition, since the conventional air conditioner is fixedly installed at one place in a room, the discharge direction of a cold air or a warm air is limited. Thus, the cold air or the warm air may not be blown toward a specific region in a room, or there may be generated a dead zone in which the blowing amount of a cold or a warm air is remarkably low. Due to such a problem, the cooling and heating efficiency of a room is remarkably lowered.

Under the circumstances, there have been developed various air conditioners capable of locally cooling and heating a specific region in a room and capable of efficiently cooling and heating a dead zone in a room.

As an example thereof, there is known a movable air conditioner. The movable air conditioner is configured so that an air conditioning unit for performing an air conditioning operation is movable. After the air conditioning unit is moved to a place where cooling or heating are required, the air conditioning unit is operated to provide a cold or a warm air. In particular, the movable air conditioner provides a warm air discharged from a heating heat exchanger of the air conditioning unit or a cold air discharged from a cooling heat exchanger of the air conditioning unit.

Therefore, it is possible to locally cool or heat the place where an air conditioning operation is required, and to effectively cool or heat a cooling or heating dead zone.

In some cases, the movable air conditioner may include a sensing unit for sensing a air conditioning load side in a room, a moving unit for moving the air conditioning unit, and a control unit for controlling the moving unit to move the air conditioning unit toward the air conditioning load side.

In particular, after the air conditioning load in the room requiring the air conditioning operation is sensed by the sensing unit, the control unit controls the moving unit to move the air conditioning unit toward the sensed air conditioning load and operates the air conditioning unit moved toward the air conditioning load.

Therefore, after locating the air conditioning load in the room where the air conditioning operation is required and moving toward the air conditioning load by itself, the movable air conditioner automatically cools or heats the air conditioning load by supplying a cold air or a warm air to the air conditioning load.

However, such a conventional movable air conditioner has a disadvantage in that the cooling and heating performance is deteriorated because the movable air conditioner has a structure in which a warm air and a cold air are always generated from a heating heat exchanger and a cooling heat exchanger of the air conditioning unit regardless of the cooling or heating state.

Particularly, in a cooling mode, the cooling performance is remarkably deteriorated because the warm air of the heating heat exchanger is continuously discharged into the room in spite of the cooling mode. In a heating mode, the heating performance is remarkably deteriorated because the cold air of the cooling heat exchanger is continuously discharged into the room in spite of the heating mode.

In addition, although the conventional movable air conditioner moves to the air conditioning load and locally cools or heats the air conditioning load, it is still used only in a specific space such as a room or the like. Thus, the use thereof is very limited.

In particular, the conventional movable air conditioner is not free to move because it is bulky and heavy. Therefore, the utilization of the conventional movable air conditioner is very limited.

SUMMARY OF THE INVENTION

In view of the aforementioned problems inherent in the related art, it is an object of the present invention to provide a movable air conditioner capable of limiting the release of heating energy generated from a heating heat exchanger in a cooling mode and limiting the release of cooling energy generated from a cooling heat exchanger in a heating mode.

Another object of the present invention is to provide a movable air conditioner capable of remarkably improving the cooling and heating performance.

A further object of the present invention is to provide a movable air conditioner capable of enabling a user to remove and independently use only an air conditioning unit as necessary.

A still further object of the present invention is to provide a movable air conditioner capable of enabling a user to carry and use the air conditioning unit at any place where cooling or heating is required and enhancing the utilization of the movable air conditioner.

In order to achieve the above objects, there is provided a movable air conditioner, including: an air conditioner main body; an air conditioning unit installed in the air conditioner main body and configured to generate a cold air or a warm air; a control unit configured to control the air conditioning unit; and an attachment/detachment unit configured to detachably attach the air conditioning unit to the air conditioner main body so that the air conditioning unit can be optionally detached from the air conditioner main body and can be used independently.

Preferably, the air conditioning unit may include an air conditioning casing, a compressor, a heating heat exchanger, an expansion valve, a cooling heat exchanger, a blower fan, an opening/closing door and a power supply battery, and the attachment/detachment unit may include an air conditioning unit installation space formed in the air conditioner main body so that the air conditioning casing of the air conditioning unit can be removably accommodated in the air conditioning unit installation space, and a connector configured to electrically connect the air conditioning unit and the control unit so that the air conditioning unit and the control unit can be electrically connected or disconnected when the air conditioning unit is mounted in the air conditioning unit installation space or removed from the air conditioning unit installation space.

The air conditioning unit may further include a an auxiliary control unit configured to control the compressor, the heating heat exchanger, the expansion valve, the cooling heat exchanger, the blower fan, the opening/closing door and the power supply battery, and the air conditioning unit may be controlled by the control unit connected through the connector when the air conditioning unit is mounted on the air conditioner main body, and the air conditioning unit may be controlled by the auxiliary control unit when the air conditioning unit is removed from the air conditioner main body.

The air conditioning casing of the air conditioning unit may include a cold air flow path configured to supply a cold air of the cooling heat exchanger in a cooling mode, a warm air flow path configured to supply a warm air of the heating heat exchanger in a heating mode, a waste heat flow path configured to discharge a waste warm air generated in the heating heat exchanger in the cooling mode and to discharge a waste cold air generated in the cooling heat exchanger in the heating mode, and a waste heat treatment device installed in the waste heat flow path so as to absorb heating energy of a waste warm air generated from the heating heat exchanger in the cooling mode and absorb cooling energy of a waste cold air generated from the cooling heat exchanger in the heating mode.

The attachment/detachment unit may include a drawer-type air conditioning unit accommodation tray having an air conditioning unit storage compartment for storing the air conditioning unit, and the drawer-type air conditioning unit accommodation tray may be installed in the air conditioner main body so that the tray can be mounted on the air conditioner main body after storing the air conditioning unit in the air conditioning unit storage compartment or can be pulled out from the air conditioner main body.

The movable air conditioner according to the present invention has a structure in which the air conditioning unit can be removed and independently used, if necessary, so that a user can carry and use the air conditioning unit at any place where cooling and heating are required. Therefore, the utilization of the movable air conditioner is enhanced.

Further, since the waste heat dissipated unnecessarily is treated by a heat accumulation pack, it is possible to prevent the deterioration of cooling and heating performance due to the waste heat dissipated unnecessarily.

Particularly, in the cooling mode, the heating energy of the heating heat exchanger is treated by the heat accumulation pack to limit the release of the heating energy. In the heating mode, the cooling energy of the cooling heat exchanger is treated by the heat accumulation pack to limit the release of the cooling energy. Therefore, it is possible to minimize the release of unnecessary waste heat, thereby remarkably improving the cooling and heating performance.

In addition, the air conditioner unit is detached and attached using the drawer type air conditioner unit tray. This makes it easy to detach and attach the air conditioner unit.

MODE FOR CARRYING OUT THE INVENTION

Figure 1:
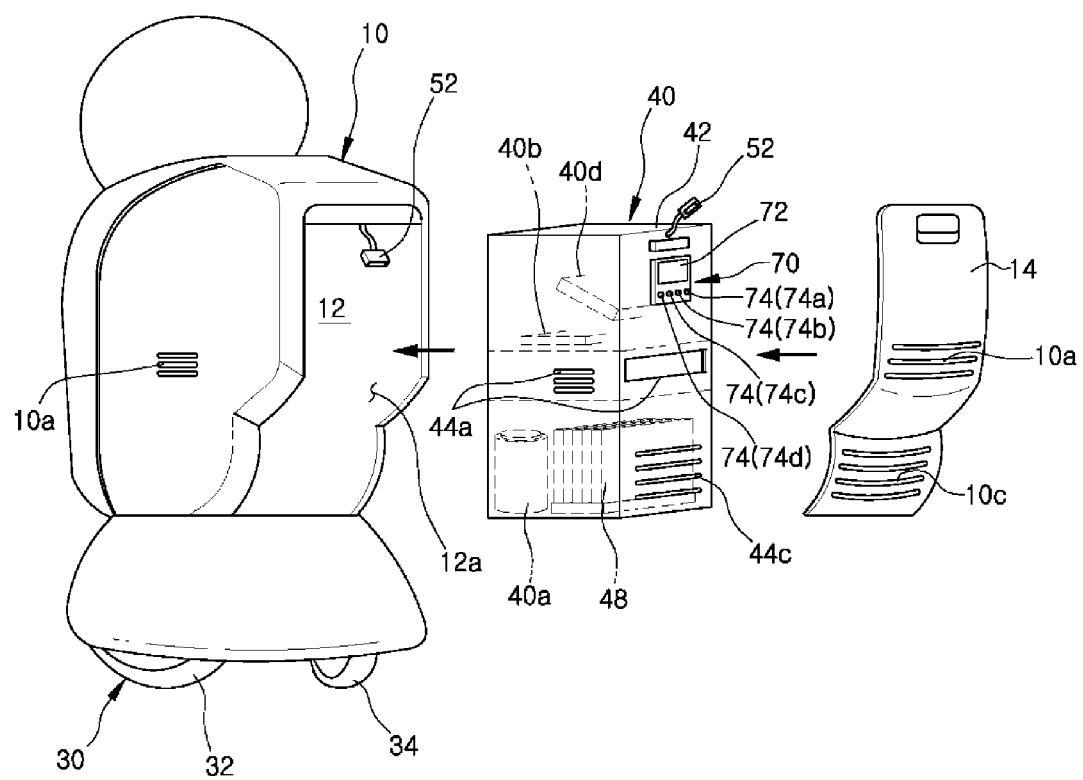
FIG. 1 is a perspective view of a movable air conditioner according to a first embodiment of the present invention, showing major parts in an exploded state.

Preferred embodiments of a movable air conditioner according to the present invention will now be described in detail with reference to the accompanying drawings.

First Embodiment

Prior to describing the features of a movable air conditioner according to the present invention, the basic configuration of the movable air conditioner will be briefly described with reference to FIGS. 1 to 3.

The movable air conditioner includes an air conditioner main body 10. A sensing unit 20, a moving unit 30, an air conditioning unit 40, a power supply battery 50 and a control unit 60 are installed in the air conditioner main body 10.

The sensing unit 20 is formed of an infrared sensor, a camera or the like. The sensing unit 20 senses a human body in a room by capturing an image of the room and processing the captured image.

The moving unit 30 includes a driving wheel 32, a steering wheel 34, a drive motor 36 for driving the driving wheel 32, and a steering motor 38 for controlling the steering wheel 34. The moving unit 30 is operated by the electric power to move the air conditioner main body 10 to a specific place.

The air conditioning unit 40 includes a compressor 40a, a heating heat exchanger 40b, an expansion valve 40c, a cooling heat exchanger 40d, blower fans 40e and opening/closing doors 40f. A refrigerant is compressed by the compressor 40a and then circulated sequentially. A warm air is generated in the heating heat exchanger 40b and a cold air is generated in the cooling heat exchanger 40d.

The warm air generated in the heating heat exchanger 40b is blown into the room to heat the room, and the cold air generated in the cooling heat exchanger 40d is blown into the room to cool the room.

The power supply battery 50 supplies electric power to the sensing unit 20, the moving unit 30 and the air conditioning unit 40. Accordingly, the sensing unit 20, the moving unit 30 and the air conditioning unit 40 can be driven.

In this regard, the power supply battery 50 is chargeable. When electricity is consumed, electricity is charged to the power supply battery 50 through a charging station (not shown).

The control unit 60 is provided with a microprocessor and is configured to control the sensing unit 20, the moving unit 30, the air conditioning unit 40 and the power supply battery 50.

In particular, when a person is recognized by the sensing unit 20, the control unit 30 controls the moving unit 30 to move the air conditioner main body 10 toward the person. Then, the control unit 60 controls the air conditioning unit 40 so that a cold air or a warm air is blown toward the person. When the battery power of the power supply battery 50 is exhausted, the air conditioner main body 10 is returned to the charging station.

Since the sensing unit 20, the moving unit 30, the air conditioning unit 40, the power supply battery 50 and the control unit 60 are well known in the art, detailed description thereof will be omitted.

Next, the features of the movable air conditioner according to the present invention will be described in detail with reference to FIGS. 1 to 3.

The movable air conditioner of the present invention is provided with an air conditioning unit 40 for generating a cold air or a warm air. The air conditioning unit 40 is detachable from the air conditioner main body 10. The air conditioning unit 40 can be used independently.

More specifically, the air conditioner main body 10 has an air conditioning unit installation space 12 provided therein.

The air conditioning unit installation space 12 has a rear opening portion 12a through which the air conditioning unit 40 can be installed in the air conditioning unit installation space 12 or can be detached from the air conditioner main body 10. The rear opening portion 12a of the air conditioning unit installation space 12 is opened and closed by a separate cover 14.

On the other hand, the air conditioning unit 40 includes an air conditioning casing 42. The air conditioning casing 42 is a rectangular box body and is configured to be accommodated in the air conditioning unit installation space 12 of the air conditioner main body 10 or to be detached and removed from the air conditioning unit installation space 12.

The air conditioning casing 42 has an internal space 44, lateral and rear air inlet ports 44a, a front air outlet port 44b, and a rear waste heat dissipation port 44c.

Figure 2:
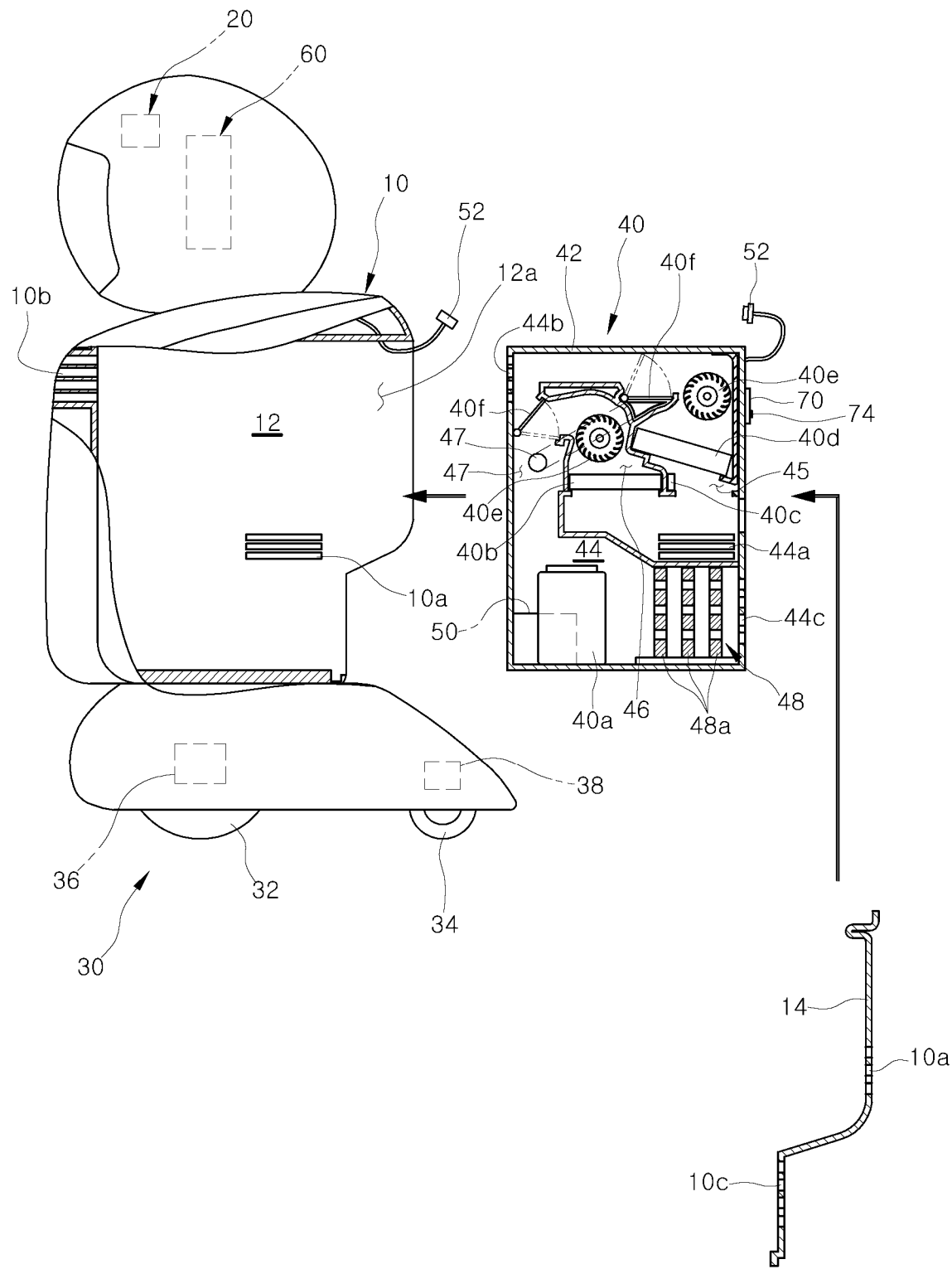
FIG. 2 is a side sectional view of the movable air conditioner according to the first embodiment of the present invention, showing major parts in an exploded state.
Figure 3:
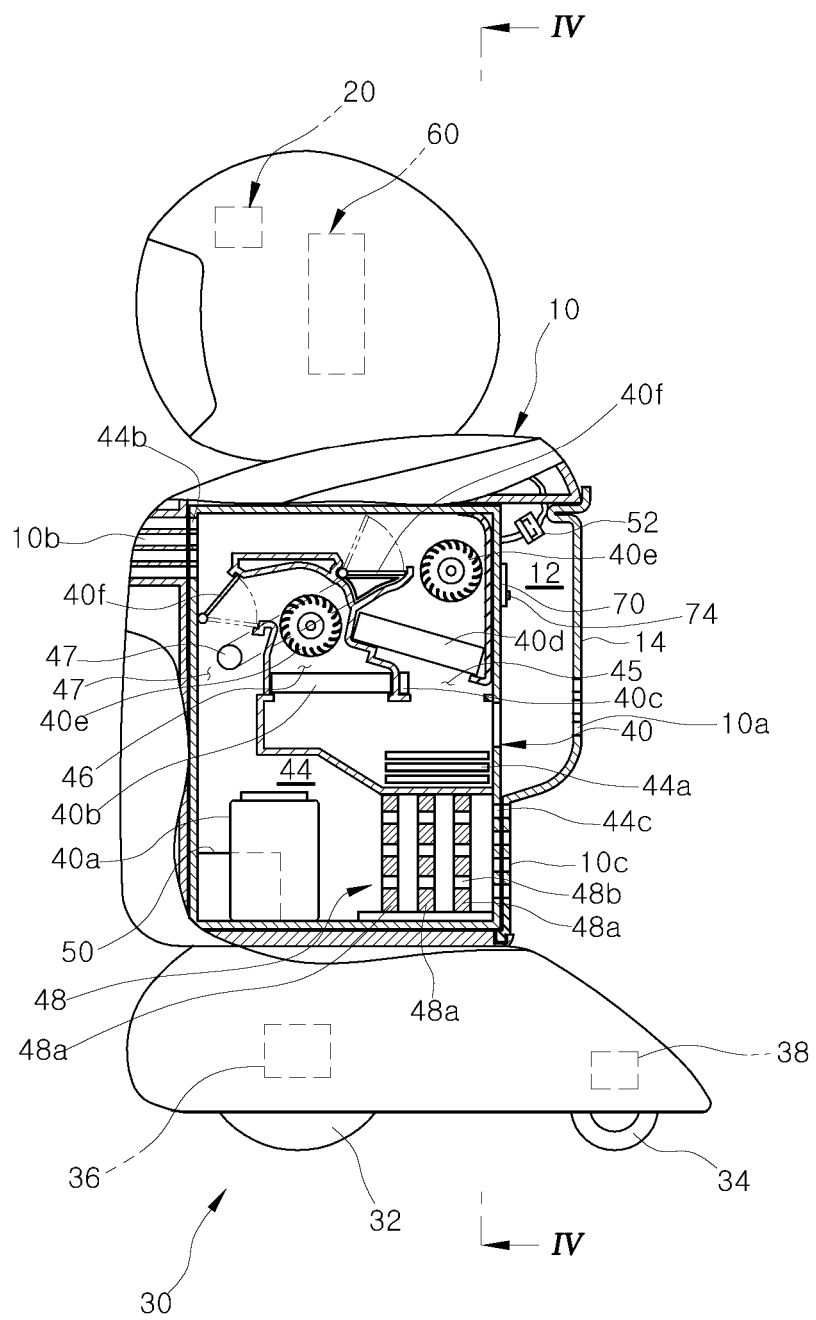
FIG. 3 is a sectional view showing a combined state of the movable air conditioner shown in FIG. 2.

As shown in FIGS. 1, 2 and 3, when the air conditioning casing 42 is installed in the air conditioning unit installation space 12 of the air conditioner main body 10, the lateral and rear air inlet ports 44a, the front air outlet port 44b and the rear waste heat dissipation port 44c are respectively aligned with an air inlet path 10a, an air outlet path 10b and a waste heat dissipation path 10c formed in the air conditioner main body 10.

The lateral and rear air inlet ports 44a, the front air outlet port 44b and the rear waste heat dissipation port 44c are configured to introduce an external air and to discharge the introduced air.

Particularly, when the air conditioning casing 42 is installed in the air conditioning unit installation space 12 of the air conditioner main body 10, an external air is introduced through the air inlet path 10a of the air conditioner main body 10, and the introduced air is discharged through the air outlet path 10b and the waste heat dissipation path 10c of the air conditioner main body 10.

Conversely, when the air conditioning casing 42 is separated from the air conditioner main body 10, the external air is directly introduced and the introduced air is directly discharged as shown in FIG. 2.

As shown in FIGS. 2 and 3, the internal space 44 of the air conditioning casing 42 includes a cold air flow path 45, a warm air flow path 46, and a waste heat flow path 47 branched from the cold air flow path 45 and the warm air flow path 46 and then joined together.

A cooling heat exchanger 40d, a blower fan 40e and an opening/closing door 40f are sequentially installed in the cold air flow path 45. The end portion of the cold air flow path 45 is connected to the front air outlet port 44b of the air conditioning casing 42.

When the cooling heat exchanger 40d and the front air outlet port 44b are brought into communication with each other by the opening/closing door 40f in a cooling mode, the cold air flow path 45 allows the cold air passed through the cooling heat exchanger 40d to flow toward the front air outlet port 44b.

Thus, the cold air flowing toward the front air outlet port 44b is discharged through the front air outlet port 44b. This allows the surrounding portion to be cooled.

Particularly, when the air conditioning unit 40 is installed in the air conditioner main body 10, the surrounding portion of the air conditioner main body 10 can be cooled. When the air conditioning unit 40 is separated from the air conditioner main body 10 and is used independently, the surrounding portion of the air conditioning unit 40 can be cooled.

A heating heat exchanger 40b, a blower fan 40e and an opening/closing door 40f are sequentially installed in the warm air flow path 46. The end portion of the warm air flow path 46 is connected to the front air outlet port 44b of the air conditioning casing 42.

When the heating heat exchanger 40b and the front air outlet port 44b are brought into communication with each other by the opening/closing door 40f in a heating mode, the warm air flow path 46 allows the warm air passed through the heating heat exchanger 40b to flow toward the front air outlet port 44b.

Thus, the warm air flowing toward the front air outlet port 44b can be discharged through the front air outlet port 44b. This allows the surrounding portion to be heated.

Particularly, when the air conditioning unit 40 is installed in the air conditioner main body 10, the surrounding portion of the air conditioner main body 10 can be heated. When the air conditioning unit 40 is separated from the air conditioner main body 10 and is used independently, the surrounding portion of the air conditioning unit 40 can be heated.

The waste heat flow path 47 is connected to the rear waste heat dissipation port 44c at the end portion thereof. The waste heat flow path 47 thus connected allows the cold air or the warm air discharged from the cold air flow path 45 and the warm air flow path 46 to flow toward the rear waste heat dissipation port 44c.

Particularly, in the cooling mode, the waste warm air on the side of the warm air flow path 46 discharged from the heating heat exchanger 40b flows toward the rear waste heat dissipation port 44c. In the heating mode, the waste cold air on the side of the cold air flow path 45 discharged from the cooling heat exchanger 40d flows toward the rear waste heat dissipation port 44c.

Accordingly, in the cooling mode, the heating energy of the heating heat exchanger 40b can be discharged to the outside through the rear waste heat dissipation port 44c. In the heating mode, the cooling energy of the cooling heat exchanger 40d can be discharged to the outside through the rear waste heat dissipation port 44c.

On the other hand, a waste heat treatment device 48 is installed in the waste heat flow path 47. The waste heat treatment device 48 is formed of a plurality of heat accumulation packs 48a containing a heat accumulation material therein.

The heat accumulation packs 48a are installed in the waste heat flow path 47 in a spaced-apart relationship with each other. The heat accumulation packs 48a are configured to exchange heat with the cold air or the warm air passing through the waste heat flow path 47 and to absorb the waste heat from the cold air or the warm air.

Particularly, in the cooling mode, the heat of the warm air discharged from the heating heat exchanger 40b is absorbed. In the heating mode, the cooling energy of the cold air discharged from the cooling heat exchanger 40d is absorbed.

Therefore, in the cooling mode, the release of the heating energy from the air conditioning unit 40 is limited to the utmost. In the heating mode, the release of the cooling energy from the air conditioning unit 40 is limited to the utmost. Thus, at the time of cooling and heating, it is possible to prevent the release of unnecessary waste heat from the air conditioning unit 40. As a result, the phenomenon of deterioration of the cooling and heating performance due to the release of waste heat can be significantly improved.

Each of the heat accumulation packs 48a has a plurality of air vent holes 48b which assures smooth flow of an air in the waste heat flow path 47 and increases the contact area between the air in the waste heat flow path 47 and the heat accumulation packs 48a, thereby improving the heat accumulation performance of the heat accumulation packs 48a.

Referring again to FIGS. 2 and 3, the air conditioning unit 40 is provided with a compressor 40a installed in the waste heat flow path 47 of the internal space 44.

The compressor 40a installed in the waste heat flow path 47 is configured to make contact with the air flowing along the waste heat flow path 47. The compressor 40a is configured to exchange heat with the air in the waste heat flow path 47.

In particular, the compressor 40a is cooled by exchanging heat with the air in the waste heat flow path 47, whereby the refrigerant compression performance is improved and the service life of the compressor 40a is extended.

In addition, in the heating mode, the compressor 40a exchanges heat with the cold air discharged from the cooling heat exchanger 40d, thereby increasing the temperature of the cold air. Therefore, in the heating mode, the release of the cooling energy from the air conditioning unit 40 is prevented, thereby improving the heating performance of the air conditioning unit 40.

Referring to FIG. 3, it is preferable that the compressor 40a is installed at the lower portion of the air conditioning casing 42 together with the waste heat treatment device 48.

The heat exchangers such as the heating heat exchanger 40b and the cooling heat exchanger 40d are preferably provided in the upper portion of the air conditioning casing 42.

The reason for adopting this construction is to realize a vertical structure in which the heat exchangers are disposed on the upper side and the compressor 40a and the waste heat treatment device 48 are disposed on the lower side. This makes it possible to promote space utilization and to ensure that the waste cold air and the waste warm air are discharged through the compressor 40a on the lower side.

Referring again to FIGS. 2 and 3, the air conditioning unit 40 includes a power supply battery 50 installed therein.

The power supply battery 50 is installed in the internal space 44 of the air conditioning unit 40 and is configured to supply electric power to the respective electric devices of the air conditioning unit 40.

Particularly, electric power is supplied to the compressor 40a, the expansion valve 40c, the blower fan 40e and the opening/closing door 40f of the air conditioning unit 40. Accordingly, the air conditioning unit 40 can be independently driven to perform the cooling and heating operations independently.

It is preferable that the power supply battery 50 is installed in the waste heat flow path 47 of the inner space 44.

This is to make sure that the power supply battery 50 makes contact with the air flowing along the waste heat flow path 47 and exchanges heat with air in the waste heat flow path 47. Specifically, this is to make sure that the power supply battery 50 is cooled by exchanging heat with the air in the waste heat flow path 47 and that in the heating mode, the power supply battery 50 exchanges heat with the cold air discharged from the cooling heat exchanger 40d to increase the temperature of the cold air.

On the other hand, the power supply battery 50 is configured to be electrically connected to the air conditioner main body 10 by a connector 52.

Particularly, when the air conditioning unit 40 is mounted on the air conditioner main body 10, the power supply battery 50 is electrically connected to the control unit 60 of the air conditioner main body 10. The power supply battery 50 configured in this manner is under the control of the control unit 60.

For example, the power supply battery 50 is charged with electric power through the control unit 60 and is configured to supply electric power to the respective electric devices of the air conditioning unit 40 under the control of the control unit 60.

Further, the power supply battery 50 controls the amount of electric power applied to the respective electric devices, for example, the compressor 40a, the opening/closing door 40f and the blower fan 40e whereby the rotational speed of the compressor 40a, the opening amount of the opening/closing door 40f and the rotational speed of the blower fan 40e can be controlled. Thus, the air conditioning unit 40 can be actively controlled according to the control value of the air conditioner main body 10.

When the air conditioning unit 40 is separated from the air conditioner main body 10 and used independently, the connector is separated from the power supply battery 50 and the air conditioning unit 40 is detached from the air conditioner main body 10.

When the power supply battery 50 is disconnected from the control unit 60 of the air conditioner main body 10, the power supply battery 50 can be charged with electric power through an external power source, for example, a commercial power source connected to the connector 52.

Referring again to FIGS. 1, 2 and 3, the air conditioning unit 40 further includes an auxiliary control unit 70.

The auxiliary control unit 70 is installed outside the air conditioning casing 42 and includes a microcomputer (not shown), a drive circuit (not shown), a display unit 72, and a plurality of control buttons 74.

The auxiliary control unit 70 is configured to control the respective electric devices of the air conditioning unit 40. When the air conditioning unit 40 is separated from the air conditioner main body 10 and used independently, the auxiliary control unit 70 can independently control the air conditioning unit 40.

Specifically, the auxiliary control unit 70 is capable of turning on or off the air conditioning unit 40, selecting one of a cooling mode and a heating mode, and adjusting the temperature and flow rate of the cold air or the warm air discharged from the air conditioning unit 40.

Each of the control buttons 74 of the auxiliary control unit 70 includes an on/off button 74a, a mode selection button 74b, a temperature control button 74c, and an air flow rate control button 74d. The display unit 72 is configured to display an operation state and a series of operation processes of the air conditioning unit 40.

Next, an operation example of the movable air conditioner according to the present invention will be described with reference to FIGS. 1 to 6.

First, description will be made on a case where the air conditioning unit 40 is mounted and used on the air conditioner main body 10.

Referring to FIGS. 1 to 5, in order to attach the air conditioning unit 40 to the air conditioner main body 10, the cover 14 provided on the rear surface of the air conditioner main body 10 is removed to open the air conditioning unit installation space 12 of the air conditioner main body 10.

Then, the air conditioning unit 40 is inserted into the rear opening portion 12a of the air conditioning unit installation space 12, and the inserted air conditioning unit 40 is pushed inward.

When the attachment of the air conditioning unit 40 is completed, the rear opening portion 12a of the air conditioning unit installation space 12 is closed by the cover 14. Thus, the installation of the air conditioning unit 40 is completed.

When the installation of the air conditioning unit 40 is completed, the movable air conditioner is turned on via the control unit 60 of the air conditioner main body 10.

Then, the air conditioner main body 10 recognizes a person through the sensing unit 20 and moves to the recognized person. The air conditioner main body 10 moves toward the recognized person and discharges a cold air or a warm air while being controlled in the cooling mode or the heating mode according to the cooling or heating load of the recognized person and the surrounding thereof.

Figure 4:
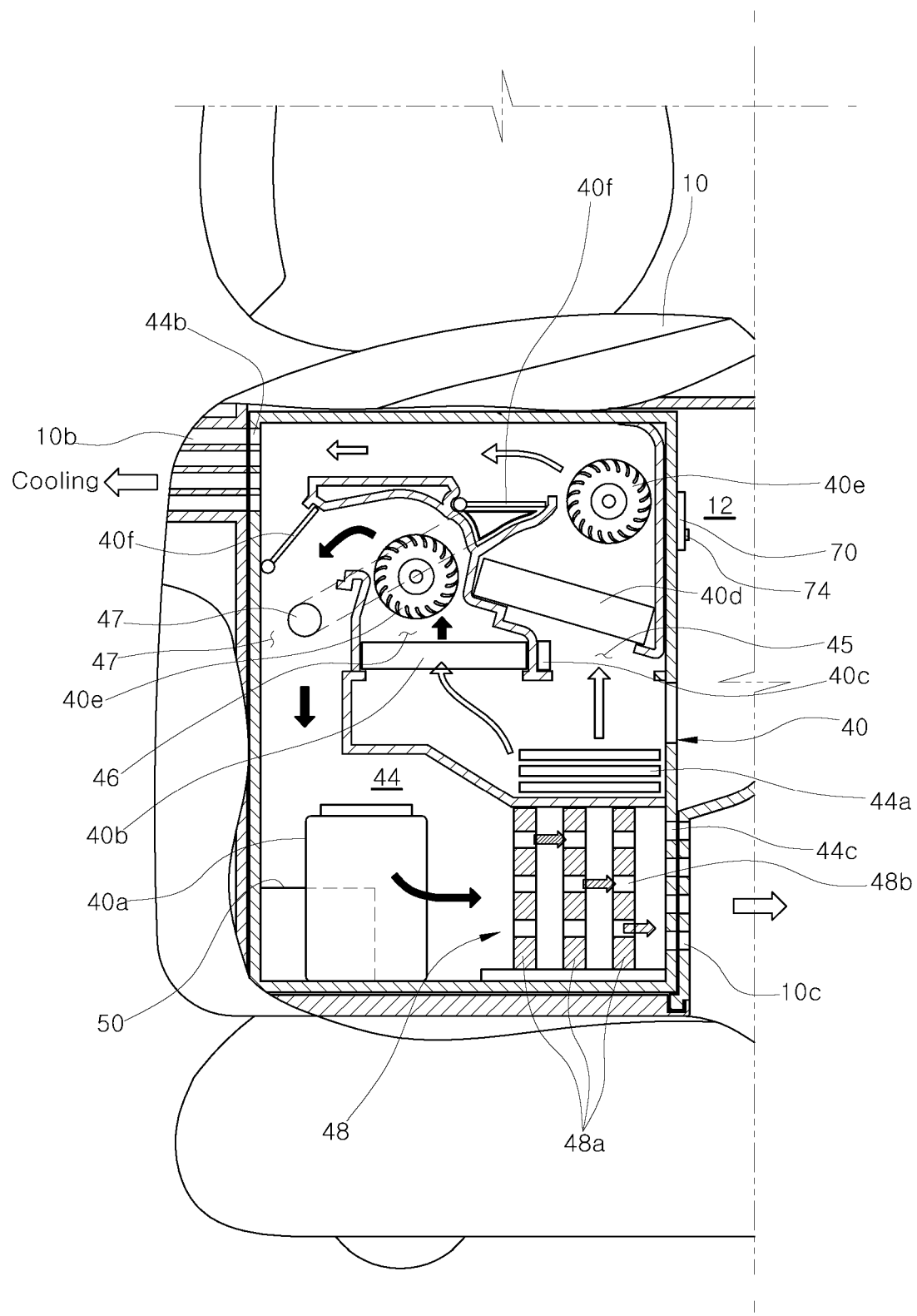
FIG. 4 is an operation view illustrating an operation example of the movable air conditioner according to the first embodiment, in which the air conditioning unit constituting the movable air conditioner of the present invention is controlled in a cooling mode in a state in which the air conditioning unit is coupled to a main body of the movable air conditioner.

When the movable air conditioner is controlled in the cooling mode, as shown in FIG. 4, the cold air discharged from the cooling heat exchanger 40d of the air conditioning unit 40 flows toward the air outlet port 44b through the cold air flow path 45. At this time, the cold air is discharged to the outside through the air outlet port 44b and the air outlet path 10b of the air conditioner main body 10. As a result, the cold air is supplied to the surrounding of the air conditioner main body 10, thereby performing a cooling operation.

In the cooling mode, the warm air discharged from the heating heat exchanger 40b of the air conditioning unit 40 is discharged along the waste heat flow path 47. The warm air thus discharged exchanges heat with the heat accumulation packs 48a installed in the waste heat flow path 47 while passing through the heat accumulation packs 48a.

The warm air of the heating heat exchanger 40b is cooled by the heat exchange and is discharged to the outside through the rear waste heat dissipation port 44c and the waste heat dissipation path 10c of the air conditioner main body 10. Thus, the warm air is prevented from being discharged at a high temperature.

As a result, in the cooling mode, the release of heating energy from the air conditioning unit 40 is limited as much as possible, thereby suppressing the deterioration of cooling performance due to the release of heating energy in the cooling mode.

Figure 5:
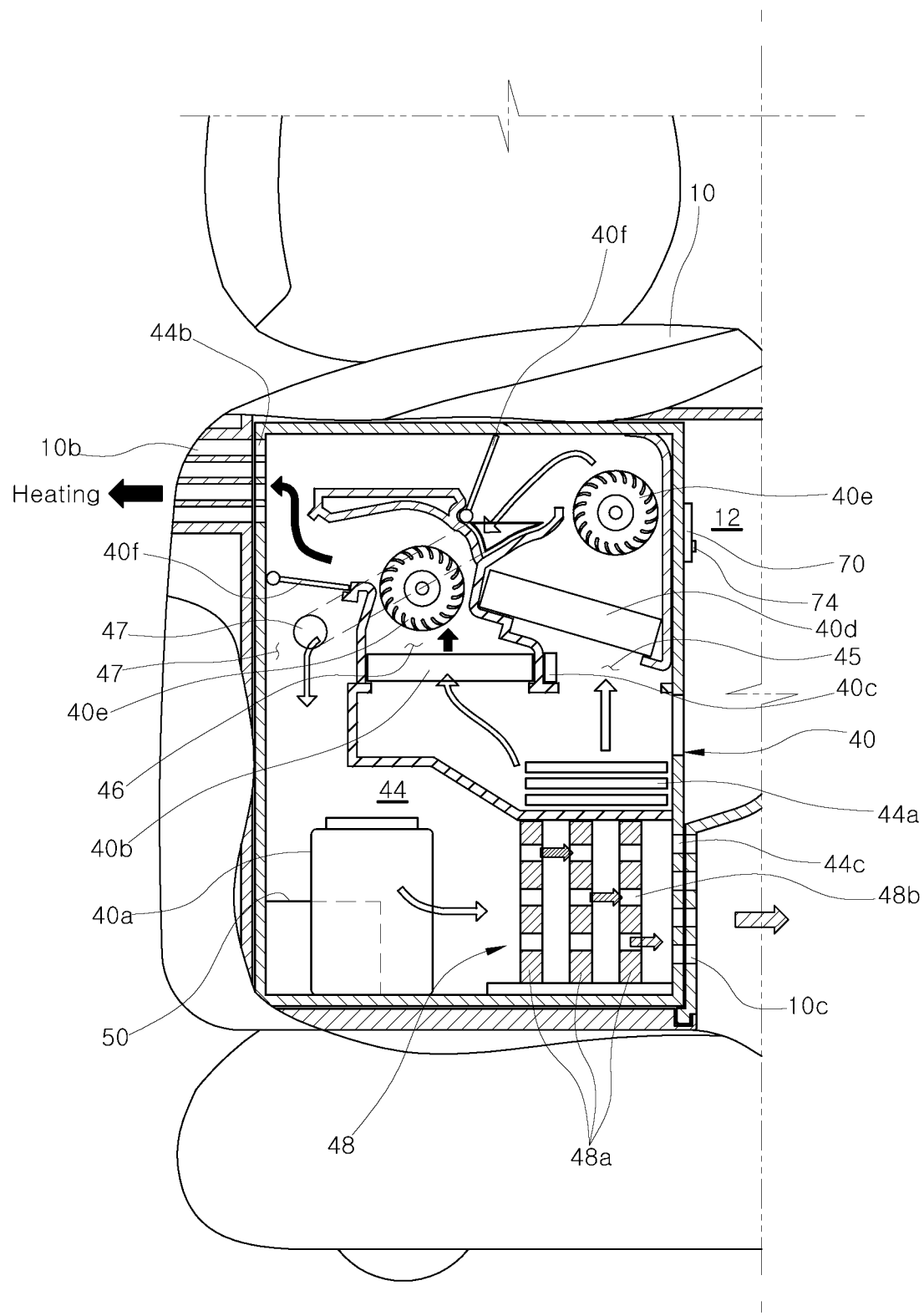
FIG. 5 is an operation view illustrating an operation example of the movable air conditioner according to the first embodiment, in which the air conditioning unit constituting the movable air conditioner of the present invention is controlled in a heating mode in a state in which the air conditioning unit is coupled to a main body of the movable air conditioner.

When the movable air conditioner is controlled in the heating mode, as shown in FIG. 5, the warm air discharged from the heating heat exchanger 40b of the air conditioning unit 40 flows toward the air outlet port 44b through the warm air flow path 46. The warm air is discharged to the outside through the air outlet port 44b and the air outlet path 10b of the air conditioner main body 10. As a result, the warm air is supplied to the surrounding of the air conditioner main body 10, thereby performing a heating operation.

On the other hand, in the heating mode, the cold air discharged from the cooling heat exchanger 40d of the air conditioning unit 40 is discharged along the waste heat flow path 47. The cold air thus discharged exchanges heat with the heat accumulation packs 48a while passing through the heat accumulation packs 48a installed in the heat accumulation packs 48a.

The cold air of the cooling heat exchanger 40d is heated by the heat exchange and is discharged to the outside through the rear waste heat dissipation port 44c and the waste heat dissipation path 10c of the air conditioner main body 10. Thus, the cold air is prevented from being discharged at a low temperature.

As a result, in the heating mode, the release of cooling energy from the air conditioning unit 40 is limited as much as possible, thereby suppressing the deterioration of heating performance due to the release of cooling energy in the heating mode.

Next, description will be made on a case where the air conditioning unit 40 is detached from the air conditioner main body 10 and used independently.

Figure 6:
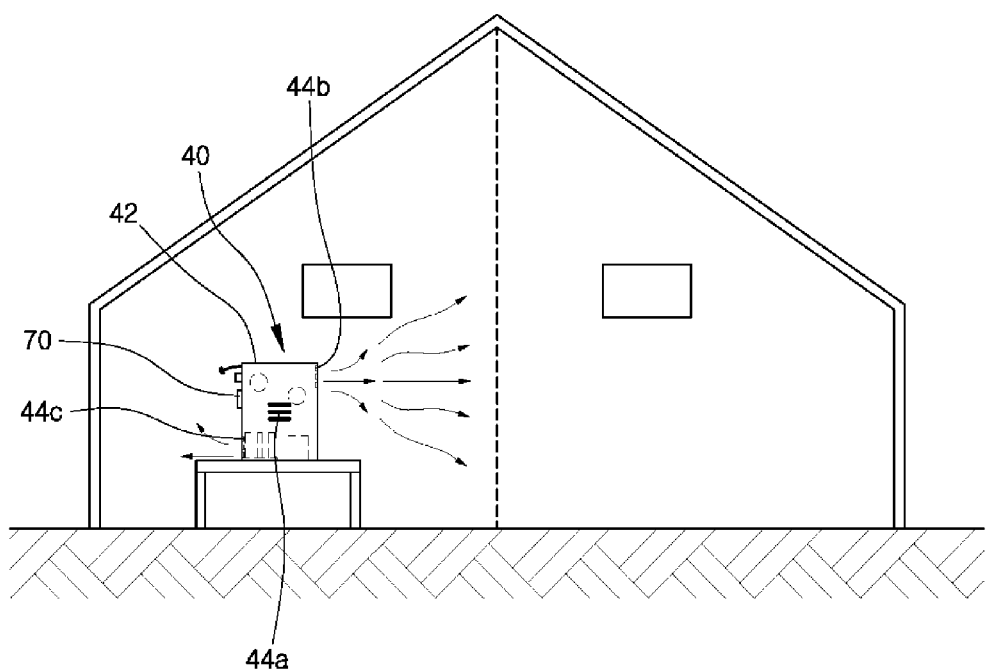
FIG. 6 is an operation view illustrating an operation example of the movable air conditioner according to the first embodiment, in which the air conditioning unit is detached from the main body of the movable air conditioner and is in use.

Referring to FIGS. 1, 2 and 6, in order to separate the air conditioning unit 40 from the air conditioner main body 10, the cover 14 provided on the rear surface of the air conditioner main body 10 is removed to open the air conditioning unit installation space 12 of the air conditioner main body 10.

Then, the air conditioning unit 40 installed in the air conditioning unit installation space 12 is pulled out and separated.

When the separation of the air conditioning unit 40 is completed, the separated air conditioning unit 40 is moved to a desired place, for example, the inside of a tent at a camping place, as shown in FIG. 6.

When the movement of the air conditioning unit 40 is completed, the control button 74 of the auxiliary control unit 70 provided in the air conditioning casing 42 is turned on to select the cooling or heating mode and the air flow rate.

Then, the air conditioning unit 40 is operated to discharge a cold air or a warm air, thereby cooling or heating the surrounding space.

Since the operation of the air conditioning unit 40 has been described above, detailed description thereof will be omitted.

According to the movable air conditioner of the first embodiment of the present invention having such a configuration, if necessary, the air conditioning unit 40 may be separated and used independently. This enables a user to carry and use the air conditioning unit 40 at any place where cooling and heating are required. Thus, it is possible to enhance the utilization of the movable air conditioner.

In addition, the waste heat dissipated unnecessarily is treated by the heat accumulation packs 48a. This makes it possible to prevent the deterioration of cooling and heating performance due to the unnecessarily dissipated waste heat.

Particularly, in the cooling mode, the heating energy on the side of the heating heat exchanger 40b is treated by the heat accumulation packs 48a to limit the release of the heating energy. In the heating mode, the cooling energy on the side of the cooling heat exchanger 40d is treated by the heat accumulation packs 48a to limit the release of the cooling energy. Thus, the release of unnecessary waste heat can be minimized, and the cooling or heating performance can be remarkably improved.

Second Embodiment

Next, a movable air conditioner according to a second embodiment of the present invention will be described with reference to FIGS. 7 to 11.

Figure 7:
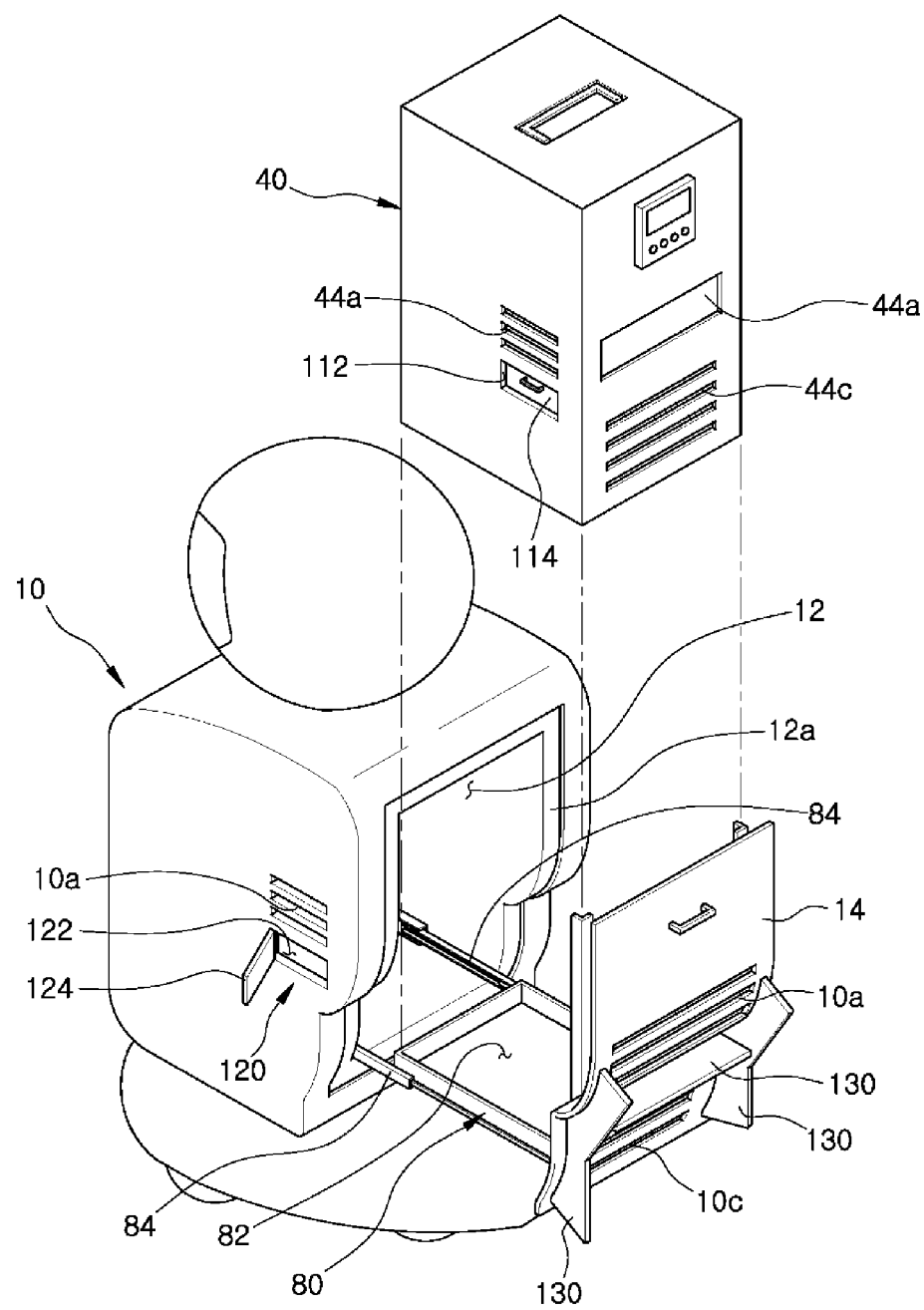
FIG. 7 is a perspective view of a movable air conditioner according to a second embodiment of the present invention, showing a state in which the air conditioning unit as a major part is detached from a main body of the movable air conditioner.
Figure 8:
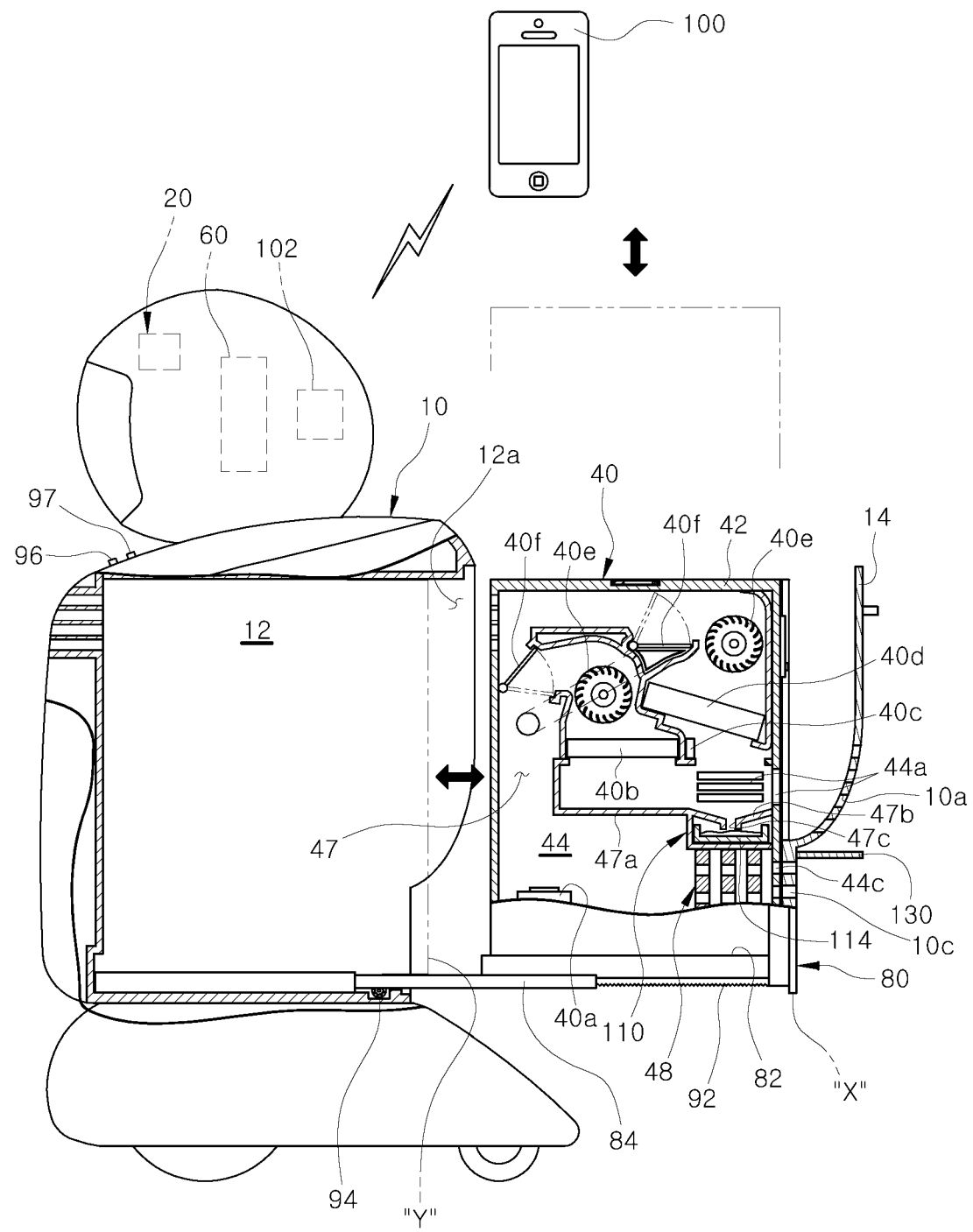
FIG. 8 is a side sectional view of the movable air conditioner shown in FIG. 7.
Figure 9:
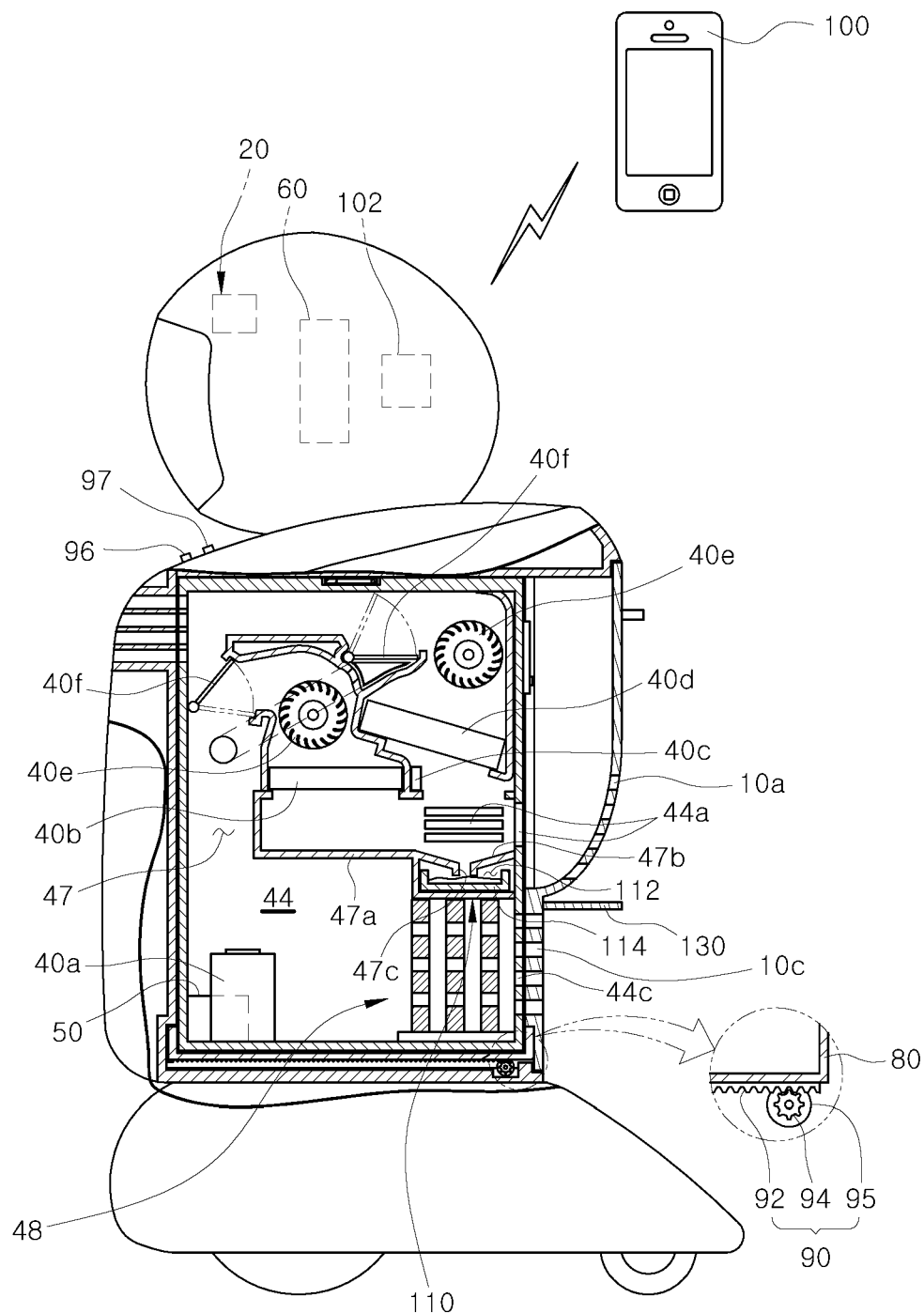
FIG. 9 is a sectional view showing a state in which the air conditioning unit is accommodated inside the main body of the movable air conditioner.

Referring first to FIGS. 7 to 9, the movable air conditioner of the second embodiment includes a drawer-type air conditioning unit accommodation tray 80 provided in the air conditioning unit installation space 12 of the air conditioner main body 10.

The drawer-type air conditioning unit accommodation tray 80 is provided with an air conditioning unit storage compartment 82 whose upper side is opened. The drawer-type air conditioning unit accommodation tray 80 is installed in the air conditioning unit installation space 12 of the air conditioner main body 10 using guide rails 84 so that it can be pulled out. The drawer-type air conditioning unit accommodation tray 80 is installed so as to be able to move between a pulled-out position X where the tray 80 is pulled out from the air conditioning unit installation space 12 and a storage position Y where the tray 80 is accommodated in the air conditioning unit installation space 12.

The drawer-type air conditioning unit accommodation tray 80 slides between the pulled-out position X and the storage position Y in a state in which the air conditioning unit 40 is stored in the air conditioning unit storage compartment 82.

The air conditioning unit 40 can be easily separated from the air conditioner main body 10 by moving the tray 80 accommodating the air conditioning unit 40 to the pulled-out position X outside the air conditioner main body 10. Furthermore, the air conditioning unit 40 can be easily mounted on the air conditioner main body 10 by moving the tray 80 accommodating the air conditioning unit 40 to the storage position Y.

Therefore, unlike the first embodiment, the user does not have to directly pull out or store the air conditioning unit 40 from or in the air conditioning unit installation space 12 of the air conditioner main body 10. This makes it possible to remarkably enhance the convenience of the user.

On the other hand, a cover 14 is integrally provided on the rear side of the drawer-type air conditioning unit accommodation tray 80.

The cover 14 corresponds to the air conditioning unit installation space 12 of the air conditioner main body 10. The cover 14 is configured to close the rear opening portion 12a of the air conditioning unit installation space 12 when the drawer-type air conditioning unit accommodation tray 80 is accommodated in the air conditioning unit installation space 12 of the air conditioner main body 10.

Furthermore, the cover 14 is configured to open the rear opening portion 12a of the air conditioning unit installation space 12 when the drawer-type air conditioning unit accommodation tray 80 is pulled out from the air conditioning unit installation space 12 of the air conditioner main body 10.

The cover 14 thus configured automatically opens or closes the air conditioning unit installation space 12 of the air conditioner main body 10 when the drawer-type air conditioning unit accommodation tray 80 is pulled out from or accommodated in the air conditioning unit installation space 12. This makes it possible to enhance the convenience of the user.

Particularly, as in the first embodiment, the cover 14 installed on the air conditioner main body 10 does not have to be manually removed or mounted in order to open or close the air conditioning unit installation space 12 of the air conditioner main body 10.

Referring to FIGS. 8 and 9, the movable air conditioner of the second embodiment further includes a drive unit 90 for driving the drawer-type air conditioning unit accommodation tray 80 between the pulled-out position X and the storage position Y.

The drive unit 90 includes a rack gear 92 provided on the bottom portion of the drawer-type air conditioning unit accommodation tray 80, a pinion gear 94 provided on the air conditioner main body 10 so as to engage with the rack gear 92, and a drive motor 95 for driving the pinion gear 94.

When the user operates a pull-out button 96 or a storage button 97 provided on the air conditioner main body 10, the drive unit 90 is rotated in the forward or reverse direction to drive the drawer-type air conditioning unit accommodation tray 80 between the pulled-out position X and the storage position Y.

Therefore, it is possible to automatically operate the drawer-type air conditioning unit accommodation tray 80, whereby the air conditioning unit 40 can be easily separated and mounted.

The drive unit 90 may be remotely operated via a remote control terminal 100, for example, a remote controller, a smartphone, or the like.

To this end, the air conditioner main body 10 includes a wireless communication unit 102 capable of making wireless communication with the remote control terminal 100 via a wireless communication means such as Wi-Fi, Bluetooth, RF, wireless Internet, and a control unit 60 for controlling the drive unit 90 in response to a control signal of the remote control terminal 100 received from the wireless communication unit 102.

In this manner, the remotely-controllable drive unit 90 can control the position of the drawer-type air conditioning unit accommodation tray 80 without directly operating the air conditioner main body 10 by the user. This makes it possible to enhance the convenience of the user.

The remote control terminal 100 incorporates an air conditioner control application program which can remotely control the movable air conditioner. In particular, a smartphone incorporating an air conditioner control application is configured to control the drawer-type air conditioning unit accommodation tray 80 of the air conditioner main body 10 through the air conditioner control application incorporated therein.

The air conditioner control application incorporated in the remote control terminal 100 may be purchased and downloaded from the application store.

Referring again to FIGS. 7 to 9, the air conditioning unit 40 of the movable air conditioner of the second embodiment includes a condensed water collection unit 110 capable of collecting the condensed water of the cooling heat exchanger 40d.

The condensed water collection unit 110 includes a condensed water collection chamber 112 on the side of a partition wall 47a partitioning the cooling heat exchanger 40d and the waste heat flow path 47, and a condensed water tray 114 disposed in the condensed water collecting chamber 112.

The condensed water collection chamber 112 is formed on the bottom surface portion of the partition wall 47a. Specifically, the condensed water collection chamber 112 is directly formed on the bottom surface portion of a hopper-type condensed water receiver 47b which directly receives and discharges the condensed water of the cooling heat exchanger 40d.

The condensed water collection chamber 112 is blocked from the waste heat flow path 47. Therefore, the waste heat flowing along the waste heat flow path 47 does not flow into the condensed water collection chamber 112.

The condensed water tray 114 is disposed in the condensed water collection chamber 112 to receive and collect the condensed water of the cooling heat exchanger 40d discharged through a drain hole 47c of the hopper-type condensed water receiver 47b.

The condensed water collection unit 110 is installed on the lower surface of the hopper-type condensed water receiver 47b and is disposed between the hopper-type condensed water receiver 47b and the waste heat flow path 47.

Therefore, the condensed water collection unit 110 serves to isolate the waste heat flow path 47 and the drain hole 47c of the condensed water receiver 47b from each other. This makes it possible to prevent the waste heat on the side of the waste heat flow path 47 from being re-introduced into the air inlet port 44a through the drain hole 47c of the condensed water receiver 47b.

As a result, it is possible to prevent deterioration of the cooling and heating performance of the cooling heat exchanger 40d and the heating heat exchanger 40b due to the inflow of waste heat toward the air inlet port 44a.

Figure 10:
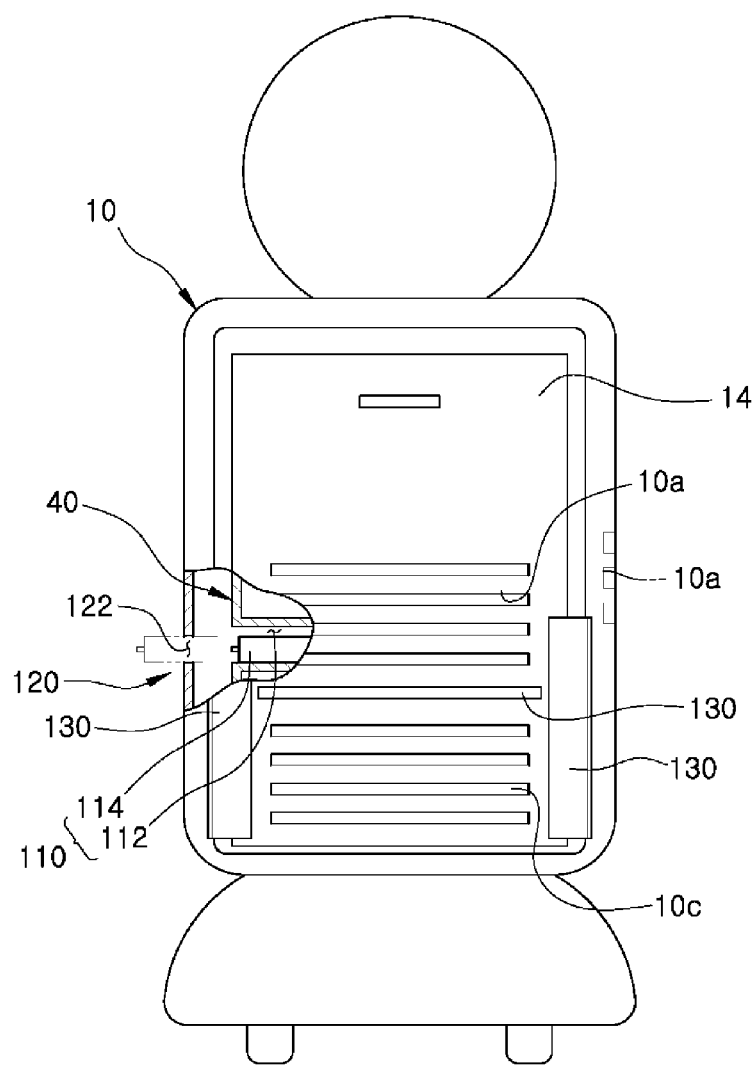
FIG. 10 is a rear view showing a state in which the air conditioning unit is accommodated inside the main body of the movable air conditioner.

As shown in FIGS. 7 and 10, the condensed water collection chamber 112 of the condensed water collection unit 110 is opened toward the side surface of the air conditioning casing 42.

The condensed water tray 114 disposed in the condensed water collection chamber 112 can be pulled out to the outside through the side opening portion of the condensed water collection chamber 112. If necessary, the condensed water tray 114 thus configured may be pulled out from the condensed water collection chamber 112 so that the collected condensed water can be removed.

The air conditioner main body 10 includes a condensed water tray pulling-out unit 120 for pulling out the condensed water tray 114 disposed in the condensed water collection chamber 112 of the air conditioning unit 40.

The condensed water tray pulling-out unit 120 includes a condensed water tray pulling-out port 122 corresponding to the condensed water collection chamber 112 of the air conditioning unit 40, and an opening/closing door 124 for opening and closing the condensed water tray pulling-out port 122.

The condensed water tray pulling-out port 122 is aligned with the condensed water collection chamber 112 of the air conditioning unit 40 when the air conditioning unit is mounted in the air conditioning unit installation space 12 of the air conditioner main body 10.

The condensed water tray pulling-out port 122 configured as described above enables a user to pull out the condensed water tray 114 of the condensed water collection unit 110 installed in the air conditioning unit 40.

Therefore, the condensed water tray 114 of the air conditioning unit 40 can be removed without separating the air conditioning unit 40 from the air conditioner main body 10. This makes it possible to easily remove the condensed water collected in the condensed water tray 114 without detaching the air conditioning unit 40 from the air conditioner main body 10. As a result, the user's convenience can be enhanced as much as possible.

Referring again to FIGS. 7 to 9, the movable air conditioner of the second embodiment further includes a baffle plate 130 installed at a portion between the air inlet path 10a of the cover 14 and the waste heat dissipation path 10c.

The baffle plate 130 is provided between the air inlet path 10a on the side of the cover 14 installed in the drawer-type air conditioning unit accommodation tray 80 and the waste heat dissipation path 10c.

The baffle plate 130 thus installed serves to isolate the air inlet path 10a and the waste heat dissipation path 10c from each other. Thus, the waste heat of the air conditioning unit 40 dissipated through the waste heat dissipation port 44c of the air conditioning unit 40 and the waste heat dissipation path 10c of the cover 14 are prevented from moving toward the air inlet path 10a of the cover 14.

This prevents the waste heat dissipated from the waste heat dissipation port 44c of the air conditioning unit 40 from being reintroduced into the air inlet port 44a of the air conditioning unit 40 through the air inlet path 10a. As a result, it is possible to prevent deterioration of the cooling and heating performance of the cooling heat exchanger 40d and the heating heat exchanger 40b due to the inflow of waste heat toward the air inlet port 44a.

Figure 11:
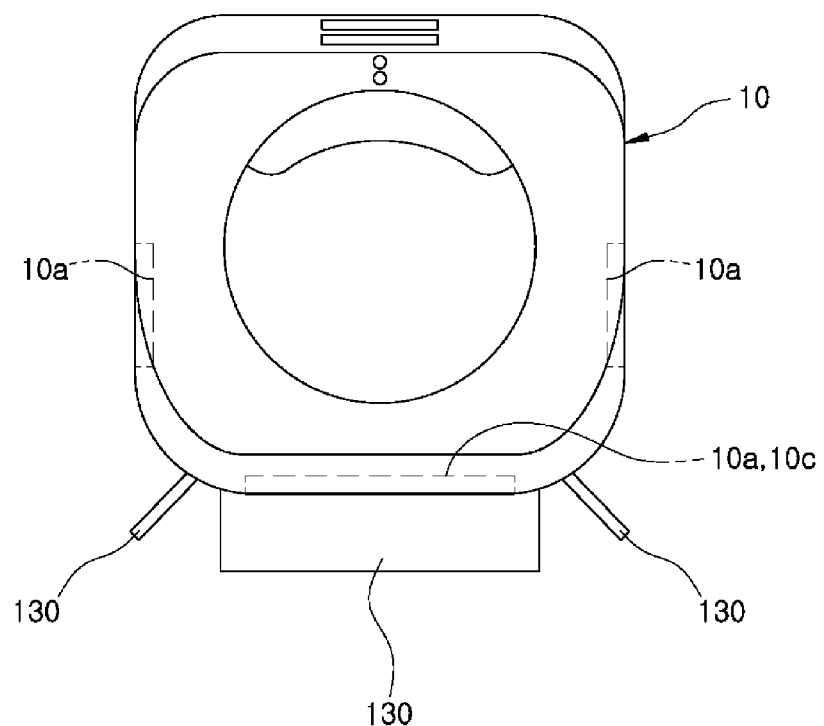
FIG. 11 is a plan view showing a state in which the air conditioning unit is accommodated inside the main body of the movable air conditioner.

As shown in FIGS. 7 and 11, the baffle plate 130 is also disposed at a portion between the waste heat dissipation path 10c of the cover 14 and the air inlet path 10a on both sides of the air conditioner main body 10.

The baffle plate 130 prevents the waste heat dissipated from the waste heat dissipation path 10c from flowing into the air inlet paths 10a of the air conditioner main body 10 and into the air inlet port 44a of the air conditioning unit 40. This prevents deterioration of the cooling and heating performance of the cooling heat exchanger 40d and the heating heat exchanger 40b due to the inflow of waste heat toward the air inlet port 44a.

According to the movable air conditioner of the second embodiment of the present invention having such a configuration, the air conditioning unit 40 is detached and attached by using the drawer-type air conditioning unit accommodation tray 80, whereby the air conditioning unit 40 can be easily separated and mounted.

The condensed water tray 114 provided in the air conditioning unit 40 can be pulled out from the outside of the air conditioner main body 10. Thus, the condensed water collected in the condensed water tray 114 can be easily removed without removing the air conditioning unit 40 from the air conditioner main body 10. This makes it possible to remarkably enhance the convenience of the user.

The waste heat flow path 47 and the air inlet port 44a are isolated by improving the position of the condensed water collection unit 110, and the waste heat dissipation port 44c of the air conditioning unit 40 and the air inlet port 44a are isolated by using the baffle plate 130. It is therefore possible to prevent the waste heat in the waste heat flow path 47 and the waste heat dissipation port 44c from flowing back to the air inlet port 44a. This makes it possible to prevent deterioration of the cooling and heating performance due to the inflow of waste heat toward the air inlet port 44a.

While some preferred embodiments of the present invention have been described above, the present invention is not limited to these embodiments. It is to be understood that various changes and modifications may be made without departing from the scope of the invention defined in the claims.

What is claimed is:

1. A movable air conditioner, comprising:
   an air conditioner main body;
   an air conditioning unit installed in the air conditioner main body and configured to generate a cold air or a warm air;
   a control unit configured to control the air conditioning unit; and
   an attachment/detachment unit configured to detachably attach the air conditioning unit to the air conditioner main body so that the air conditioning unit can be optionally detached from the air conditioner main body and used independently;
   wherein the attachment/detachment unit includes an air conditioning unit installation space formed in the air conditioner main body so that an air conditioning casing of the air conditioning unit can be removably accommodated in the air conditioning unit installation space, and a connector configured to electrically connect the air conditioning unit and the control unit so that the air conditioning unit and the control unit can be electrically connected or disconnected when the air conditioning unit is mounted in the air conditioning unit installation space or removed from the air conditioning unit installation space.

2. The movable air conditioner of claim 1, wherein the air conditioning unit includes the air conditioning casing, a compressor, a heating heat exchanger, an expansion valve, a cooling heat exchanger, a blower fan, an opening/closing door and a power supply battery.

3. The movable air conditioner of claim 2, wherein the air conditioning unit further includes an auxiliary control unit configured to control the compressor, the heating heat exchanger, the expansion valve, the cooling heat exchanger, the blower fan, the opening/closing door and the power supply battery,
   the air conditioning unit is controlled by the control unit connected through the connector when the air conditioning unit is mounted on the air conditioner main body, and
   the air conditioning unit is controlled by the auxiliary control unit when the air conditioning unit is removed from the air conditioner main body.

4. The movable air conditioner of claim 3, wherein the auxiliary control unit includes an on/off button configured to turn on or off the air conditioning unit, a mode selection button configured to select one of a cooling mode and a heating mode, a temperature control button configured to control a temperature of the cold air or the warm air discharged from the air conditioning unit, an air flow rate control button configured to control a flow rate of the cold air or the warm air discharged from the air conditioning unit.

5. The movable air conditioner of claim 2, wherein the air conditioning unit installation space is formed to be opened at a rear surface portion of the air conditioner main body,
   the air conditioning unit is mounted into the air conditioner main body or removed from the air conditioner main body through a rear opening portion of the air conditioning unit installation space, and
   the air conditioning unit installation space of the air conditioner main body is opened or closed by a cover.

6. The movable air conditioner of claim 2, wherein the air conditioning casing of the air conditioning unit includes a cold air flow path configured to supply a cold air of the cooling heat exchanger in a cooling mode, a warm air flow path configured to supply a warm air of the heating heat exchanger in a heating mode, a waste heat flow path configured to discharge a waste warm air generated in the heating heat exchanger in the cooling mode and to discharge a waste cold air generated in the cooling heat exchanger in the heating mode, and a waste heat treatment device installed in the waste heat flow path so as to absorb heating energy of a waste warm air generated from the heating heat exchanger in the cooling mode and absorb cooling energy of a waste cold air generated from the cooling heat exchanger in the heating mode.

7. The movable air conditioner of claim 6, wherein the waste heat treatment device includes a plurality of heat accumulation packs each having a heat accumulation material therein, the heat accumulation packs installed in the waste heat flow path in a spaced-apart relationship and configured to exchange heat with the waste cold air or the waste warm air passing through the waste heat flow path so as to absorb the cooling energy of the waste cold air or the heating energy of the waste warm air.

8. The movable air conditioner of claim 7, wherein the compressor of the air conditioning unit is installed in the waste heat flow path of the air conditioning casing and configured to exchange heat with the waste cold air or the waste warm air flowing along the waste heat flow path.

9. The movable air conditioner of claim 8, wherein the power supply battery of the air conditioning unit is installed in the waste heat flow path of the air conditioning casing and configured to exchange heat with the waste cold air or the waste warm air flowing along the waste heat flow path.

10. The movable air conditioner of claim 9, wherein the power supply battery of the air conditioning unit is charged with electric power through the control unit when electrically connected to the control unit by the connector and is charged with electric power through an external power supply source connected to the connector when disconnected from the control unit.

11. The movable air conditioner of claim 6, wherein the air conditioning casing includes an air inlet port configured to introduce an external air into the cold air flow path and the warm air flow path, an air outlet port configured to discharge the cold air existing in the cold air flow path and the warm air existing in the warm air flow path to the outside, a waste heat dissipation port configured to discharge the waste warm air generated from the heating heat exchanger and existing in the waste heat flow path to the outside in the cooling mode and to discharge the waste cold air generated from the cooling heat exchanger and existing in the waste heat flow path to the outside in the heating mode, and the air inlet port, the air outlet port and the waste heat dissipation port are opened outward in different directions.

12. The movable air conditioner of claim 11, wherein the air conditioner main body includes opening portions corresponding to the air inlet port, the air outlet port and the waste heat dissipation port, respectively.

13. The movable air conditioner of claim 8, wherein the heating heat exchanger and the cooling heat exchanger of the air conditioning unit are disposed in an upper portion of the air conditioning casing, and the compressor and the waste heat treatment device are disposed in a lower portion of the air conditioning casing, so that the heating heat exchanger and the cooling heat exchanger are vertically arranged with respect to the compressor and the waste heat treatment device.

14. The movable air conditioner of claim 1, further comprising:

a sensing unit configured to sense a person existing in a specific space, the sensing unit for sensing the person comprising a member selected from the group consisting of a camera and an infrared sensor;

wherein the control unit is configured to control the air conditioning unit when a person is sensed by the sensing unit.

15. The movable air conditioner of claim 2, wherein the attachment/detachment unit includes a drawer-type air conditioning unit accommodation tray having an air conditioning unit storage compartment for storing the air conditioning unit, and the drawer-type air conditioning unit accommodation tray is installed in the air conditioner main body so that the tray can be mounted on the air conditioner main body after storing the air conditioning unit in the air conditioning unit storage compartment or can be pulled out from the air conditioner main body.

16. The movable air conditioner of claim 15, wherein the air conditioning unit installation space of the air conditioner main body has a rear opening portion, the drawer-type air conditioning unit accommodation tray is installed to slide between a pulled-out position where the tray is pulled out from the air conditioning unit installation space and a storage position where the tray is stored in the air conditioning unit installation space, and the drawer-type air conditioning unit accommodation tray is integrally provided with a cover for opening the rear opening portion of the air conditioning unit installation space in the pulled-out position and closing the rear opening portion of the air conditioning unit installation space in the storage position.

17. The movable air conditioner of claim 15, further comprising:

a condensed water tray installed in the air conditioning unit so as to collect condensed water generated in the cooling heat exchanger of the air conditioning unit.

18. The movable air conditioner of claim 17, wherein the air conditioning unit includes:

an outwardly-opened condensed water collection chamber in which the condensed water tray is disposed; and a condensed water tray pulling-out unit that includes a condensed water tray pulling-out port formed in the air conditioner main body so as to correspond to an opening portion of the condensed water collection chamber and an opening/closing door configured to open and close the condensed water tray pulling-out port;

wherein the condensed water tray pulling-out port is aligned with the condensed water collection chamber when the air conditioning unit is mounted in the air conditioner main body, so that the condensed water tray can be pulled out from the condensed water collection chamber.

19. The movable air conditioner of claim 18, further comprising:

a drive unit configured to move the drawer-type air conditioning unit accommodation tray between the pulled-out position and the storage position, wherein the drive unit includes a rack gear provided in the drawer-type air conditioning unit accommodation tray, a pinion gear provided in the air conditioner main body so as to engage with the rack gear, a drive motor configured to drive the pinion gear, and a pull-out button and a storage button provided on the air conditioner main body so as to rotate the drive motor in forward and reverse directions.

20. The movable air conditioner of claim 19, further comprising:

a remote control terminal configured to remotely control the drive unit; and a wireless communication unit installed in the air conditioner main body so as to receive a remote control signal wirelessly transmitted from the remote control terminal, wherein the control unit is configured to control the drive unit in response to the remote control signal of the remote control terminal received from the wireless communication unit, and wherein the wireless communication unit is configured to receive said signal via one of Wi-Fi, Bluetooth, RF, and wireless internet communication.

21. The movable air conditioner of claim 20, wherein the remote control terminal is a smartphone which includes an air conditioner control application for remotely controlling the drive unit.

22. The movable air conditioner of claim 21, wherein the air conditioning unit further includes a waste heat flow path configured to discharge a waste warm air generated from the heating heat exchanger in a cooling mode, the waste heat flow path is arranged at a gravitationally lower portion of the cooling heat exchanger with a partition wall interposed therebetween, a hopper-type condensed water receiver configured to receive condensed water falling from a surface of the cooling heat exchanger and drain the condensed water toward the waste heat flow path through a drain hole is provided in the partition wall, and the condensed water collection chamber and the condensed water tray are provided between the hopper-type condensed water receiver and the waste heat flow path to physically isolate the waste heat flow path and the cooling heat exchanger.

23. The movable air conditioner of claim 16, wherein the air conditioner main body further includes an air inlet path configured to introduce an external air into the air conditioning unit, a waste heat dissipation path configured to dissipate waste heat generated in the air conditioning unit to the outside, and a baffle plate provided between the air inlet path and the waste heat dissipation path to prevent the waste heat dissipated from the waste heat dissipation path from being transferred to the air inlet path.

24. The movable air conditioner of claim 23, wherein the air inlet path is formed in each of the cover of the drawer-type air conditioning unit accommodation tray and side surfaces of the air conditioner main body, the waste heat dissipation path is formed in the cover of the drawer-type air conditioning unit accommodation tray, and the baffle plate is provided in the cover between the air inlet path and the waste heat dissipation path.

\* \* \* \* \*